United States Patent
Dalvi

(10) Patent No.: US 8,681,601 B1
(45) Date of Patent: Mar. 25, 2014

(54) CONNECTIVITY FAULT MANAGEMENT AND REDUNDANT TRUNK GROUP INTEGRATION

(75) Inventor: Gaurish R. Dalvi, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 273 days.

(21) Appl. No.: 13/084,369

(22) Filed: Apr. 11, 2011

(51) Int. Cl.
- *G01R 31/08* (2006.01)
- *G06F 11/00* (2006.01)
- *H04L 12/26* (2006.01)

(52) U.S. Cl.
USPC .......................... 370/216; 370/217; 370/252

(58) Field of Classification Search
USPC .......................................... 370/217, 252, 216
See application file for complete search history.

(56) References Cited

U.S. PATENT DOCUMENTS

| | | | |
|---|---|---|---|
| 2003/0165137 A1* | 9/2003 | Soloway et al. | 370/389 |
| 2007/0076590 A1* | 4/2007 | Galpin et al. | 370/216 |
| 2008/0016402 A1* | 1/2008 | Harel et al. | 714/43 |
| 2009/0003313 A1* | 1/2009 | Busch et al. | 370/352 |
| 2009/0135838 A1* | 5/2009 | Rouyer et al. | 370/401 |
| 2009/0285090 A1* | 11/2009 | Allasia et al. | 370/221 |
| 2011/0075550 A1* | 3/2011 | Sultan et al. | 370/217 |

* cited by examiner

*Primary Examiner* — Mark Rinehart
*Assistant Examiner* — Angel Brockman
(74) *Attorney, Agent, or Firm* — Harrity & Harrity, LLP

(57) ABSTRACT

A network element may include a connectivity fault manager, associated with a particular interface, to detect a connectivity fault associated with the particular interface, associated with a link between the particular interface and a remote interface, or associated with the remote interface. The network element may further include a redundant trunk group daemon, associated with the particular interface, to deactivate the particular interface and activate a backup interface in response to receiving notification of a link down event associated with the particular interface; where the connectivity fault manager is to activate the redundant trunk group daemon in response to detecting the connectivity fault; and where the redundant trunk group daemon is to deactivate the particular interface and activate a backup interface in response to being activated by the connectivity fault manager.

20 Claims, 6 Drawing Sheets

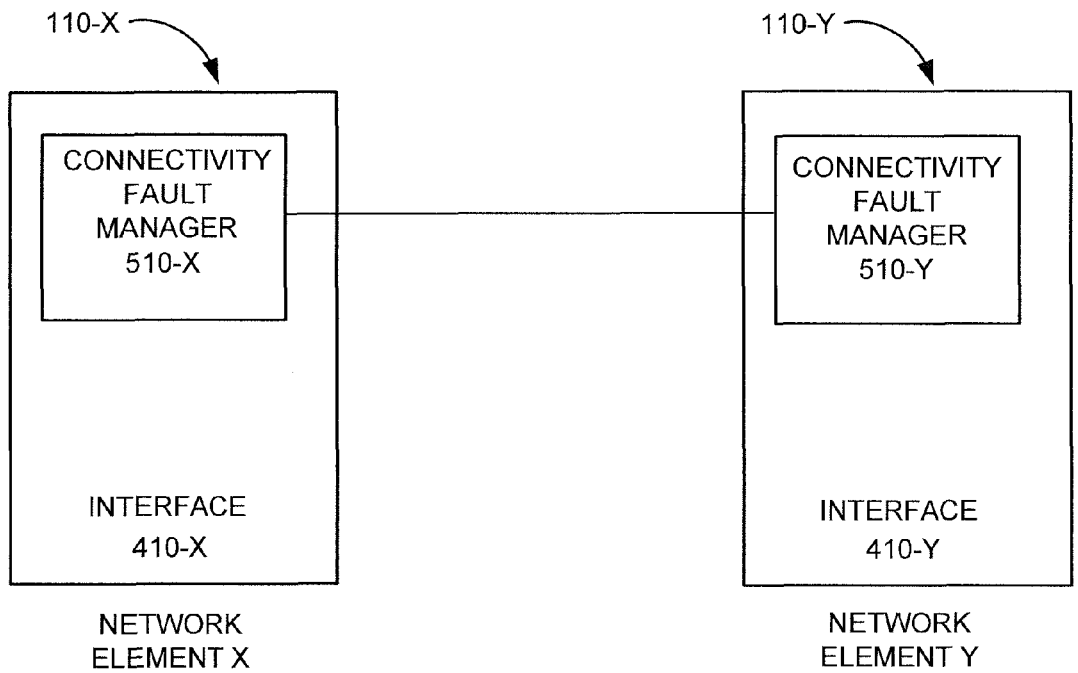
FIG. 5
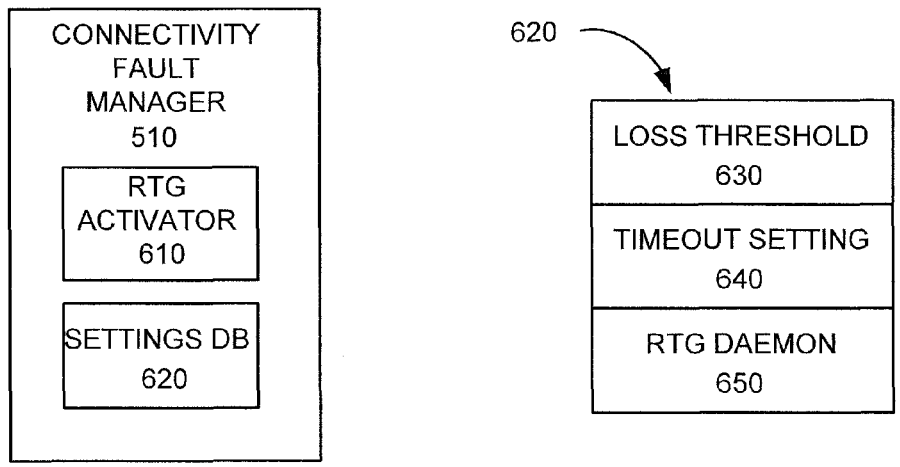
FIG. 6A  FIG. 6B

CONNECTIVITY FAULT MANAGEMENT AND REDUNDANT TRUNK GROUP INTEGRATION

BACKGROUND

Networks typically include network elements, such as routers, switches, or gateways, which transfer or switch data from one or more sources to one or more destinations. A packet is a data unit in which encapsulated information can be transmitted through a network. A network element, such as a router or a switch, may process packets. When the network element receives a packet at an input port, the network element may determine a destination and/or output port for the packet and/or determine whether to drop the packet or send the original or modified packet to another network element through an output port.

Components of the network element may malfunction or go out of service. In order to maintain functioning of the network element, the network element may contain a backup component, which may take over when a particular component of the network element malfunctions or goes out of service. A particular network element may include a large number of components. For example, the particular network element may be connected to a large number of other network elements and may maintain an interface with each other network element to which the particular network element is connected. Therefore, if one of the particular components fails, a transition to a backup component may be complicated. Furthermore, assuring that the transition occurs without an interruption in the performance of the network element may tax the resources of the network element.

SUMMARY OF THE INVENTION

According to one aspect, a network device may include a memory to store instructions; and a processor to execute the instructions to implement a connectivity fault manager, associated with a particular interface, to detect a connectivity fault associated with the particular interface, associated with a link between the particular interface and a remote interface, or associated with the remote interface; a redundant trunk group daemon, associated with the particular interface, to deactivate the particular interface and activate a backup interface in response to receiving notification of a link down event associated with the particular interface; where the connectivity fault manager is to activate the redundant trunk group daemon in response to detecting the connectivity fault; and where the redundant trunk group daemon is to deactivate the particular interface and activate a backup interface in response to being activated by the connectivity fault manager.

According to another aspect, a method, performed by a network device, may include detecting, by an interface of the network device, a connectivity fault associated with the interface, associated with a link between the interface and a remote interface, or associated with the remote interface; identifying, by the interface, a redundant trunk daemon associated with the interface; activating, by the interface, the identified redundant trunk daemon; deactivating, by a processor of the network device and using the redundant trunk daemon, the interface in response to the redundant trunk daemon being activated; and activating, by the processor and using the redundant trunk daemon, a backup interface associated with the interface in response to deactivating the interface.

According to yet another aspect, a computer-readable medium storing instructions executable by a processor, may include one or more instructions, associated with an interface of a network element, to detect a connectivity fault associated with the interface; one or more instructions to implement a redundant trunk group daemon, associated with the interface, to deactivate the interface and activate a backup interface in response to receiving notification of a link down event associated with the interface; one or more instructions to activate the redundant trunk group daemon when the connectivity fault is detected; and one or more instructions to cause, in response to the redundant trunk group daemon being activated, the redundant trunk group daemon to deactivate the interface and to activate a backup interface.

BRIEF DESCRIPTION OF THE DRAWINGS

The accompanying drawings, which are incorporated in and constitute a part of this specification, illustrate the invention and, together with the description, explain the invention. In the drawings.

FIG. 5 is a second diagram illustrating example functional components of the network device of FIG. 2 according to an implementation described herein;

FIG. 6A is a diagram illustrating example functional components of a connectivity fault manager of FIG. 5 according to an implementation described herein;

FIG. 6B is a diagram illustrating example fields of the setting database of FIG. 6A according to an implementation described herein;

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

An implementation described herein may relate to integration of connectivity fault management and redundant trunk group failover in a network device. A redundant trunk group may rely on link down detection to trigger a failover. For example, if a link down event is detected for a particular interface, a redundant trunk group daemon may deactivate the particular interface and may activate a backup interface. However, detection of a link down event may take a long time. For example, a link interface daemon may poll interfaces in the network device to determine whether there are any link down events. Polling a large number of interfaces in a network device may take a long time.

Furthermore, particular types of failures that may occur in association with an interface, or in association with a link between a first interface of a first network device and a second interface of a second network device, may result in traffic loss and may not be detected as a link down event for the interface. These particular types of failures may be detected by connectivity fault management. An implementation described herein may enable detection of interface and/or link failures not identified as a link down event by integrating a connectivity fault manager, associated with a particular interface, with a redundant trunk group daemon, associated with the particular interface. For example, the connectivity fault manager may be configured to activate redundant trunk group failover in response to detecting a connectivity fault.

Moreover, an implementation described herein may enable interface and/or link failures to be detected in as low as 30 ms, by configuring low connectivity fault management thresholds and/or timers.

Figure 1:
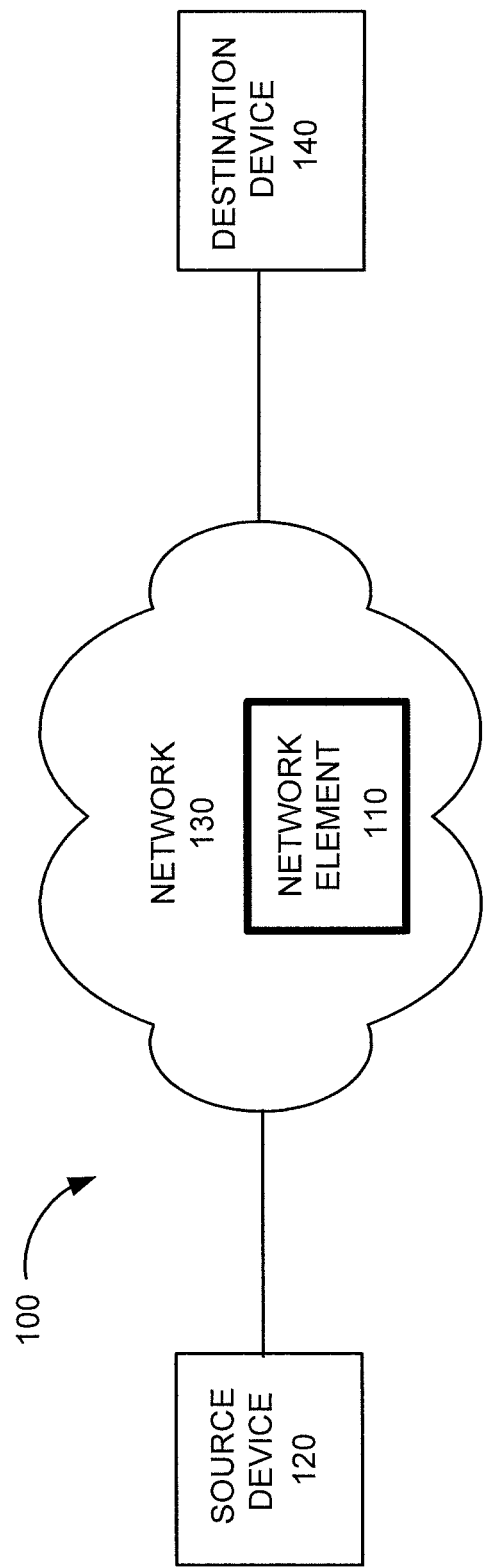
FIG. 1 is a diagram illustrating an example system according to an implementation described herein.

FIG. 1 is a diagram illustrating an example system 100 according to an implementation described herein. As shown in FIG. 1, system 100 may include one or more network elements 110 (referred to herein individually as "network element 110" and collectively as "network elements 110"), a source device 120, a network 130, and a destination device 140. Source device 120 may send packets to destination device 140 through network 130 via network element 110. While a single network element 110 is illustrated in FIG. 1 for simplicity, network 130 may include many network elements 110 and a route traveled by packets from source device 120 to destination device 140 may include multiple, and possibly a large number of, network elements 110.

Network element 110 may include any device that receives and transmits packets within a network or between networks. Network element 110 may include, for example, a gateway, a router, a switch, a firewall, a network interface card (NIC), a hub, a bridge, a proxy server, an optical add-drop multiplexer (OADM), or some other type of device (e.g., a layer 2 and/or layer 3 device) that processes and/or transfers traffic. Network element 110 may include one or more ingress interfaces and one or more egress interfaces. Network element 110 may receive a packet at one of the ingress interfaces, determine a destination of the received packet, determine an egress interface based on the determined destination, and forward the packet via the determined egress interface. Additionally, network element 110 may determine whether to forward the received packet or whether to drop the received packet.

Source device 120 and destination device 140 may include a same type of device or different types of devices. For example, source device 120 and destination device 140 may include any device with a communication function, such as a personal computer or workstation, a server device, a portable computer, a voice over Internet Protocol (VoIP) telephone device, a radiotelephone, a portable communication device (e.g. a mobile phone, a global positioning system (GPS) device, or another type of wireless device), a content recording device (e.g., a camera, a video camera, etc.), a gaming system, an access point base station, a cellular base station, and/or any type of network element encompassed by network element 110.

Network 130 may include one or more of a same type of packet-switched networks, or one or more packet-switched networks of different types. A "packet" may refer to a packet, a datagram, or a cell; a fragment of a packet, a fragment of a datagram, or a fragment of a cell; or another type, arrangement, or packaging of data. For example, network 130 may include one or more of a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of these networks or other types of networks.

Although FIG. 1 shows example components of system 100, in other implementations, system 100 may include fewer components, different components, differently arranged components, and/or additional components than depicted in FIG. 1. Additionally or alternatively, one or more components of system 100 may perform one or more tasks described as being performed by one or more other components of system 100.

Figure 2:
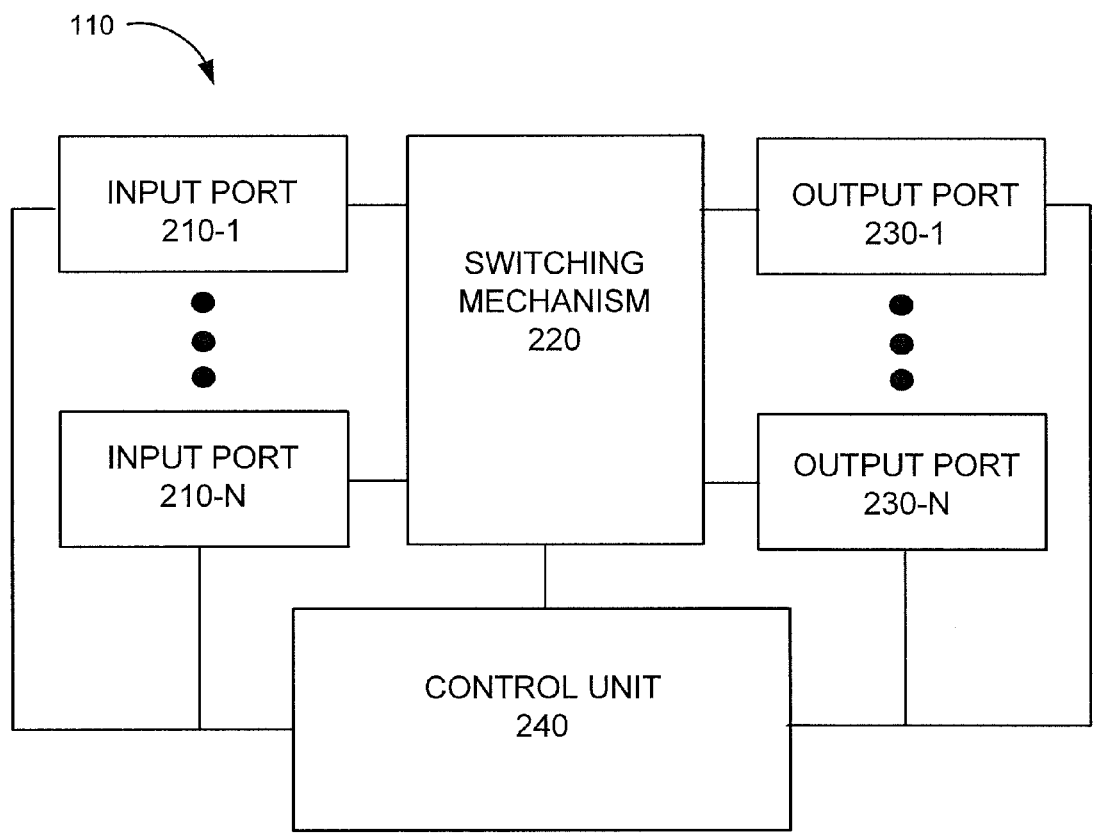
FIG. 2 is a diagram illustrating example components of a network device of the system of FIG. 1 according to an implementation described herein.

FIG. 2 is a diagram illustrating example components of network device 110 of the system of FIG. 1 according to an implementation described herein. As shown in FIG. 2, network device 110 may include may include one or more input port 210-1 to 210-N (referred to herein individually as "input port" and collectively as "input ports"), a switching mechanism 220, one or more output ports 230-1 to 230-N (referred to herein individually as "output port" and collectively as "output ports"), and a control unit 340.

Input ports 210-1 to 210-N may be the points of attachments for physical links and may be the points of entry for incoming traffic. Switching mechanism 220 may include one or more switching planes to facilitate communication between input ports 210-1 to 210-N and output ports 230-1 to 230-N. In one implementation, each of the switching planes may include a single or multi-stage switch of crossbar elements. In another implementation, each of the switching planes may include some other form(s) of switching elements. Additionally or alternatively, switching mechanism 220 include one or more processors, one or more memories, and/or one or more paths that permit communication between input ports 210-1 to 210-N and output ports 230-1 to 230-N.

Output ports 330a-330n may store traffic received from input ports 210-1 to 210-N and may schedule the traffic on one or more output physical links. Control unit 240 may interconnect with input ports 210-1 to 210-N, switching mechanism 220, and/or output ports 230-1 to 230-N and may perform control plane operations associated with network element 110. For example, control unit 240 may use routing protocols and may create a forwarding table that is used in traffic forwarding.

Although FIG. 2 shows example components of network element 110, in other implementations, network element 110 may include fewer components, different components, differently arranged components, and/or additional components than depicted in FIG. 2. Additionally or alternatively, one or more components of network element 110 may perform one or more tasks described as being performed by one or more other components of network element 110.

Figure 3:
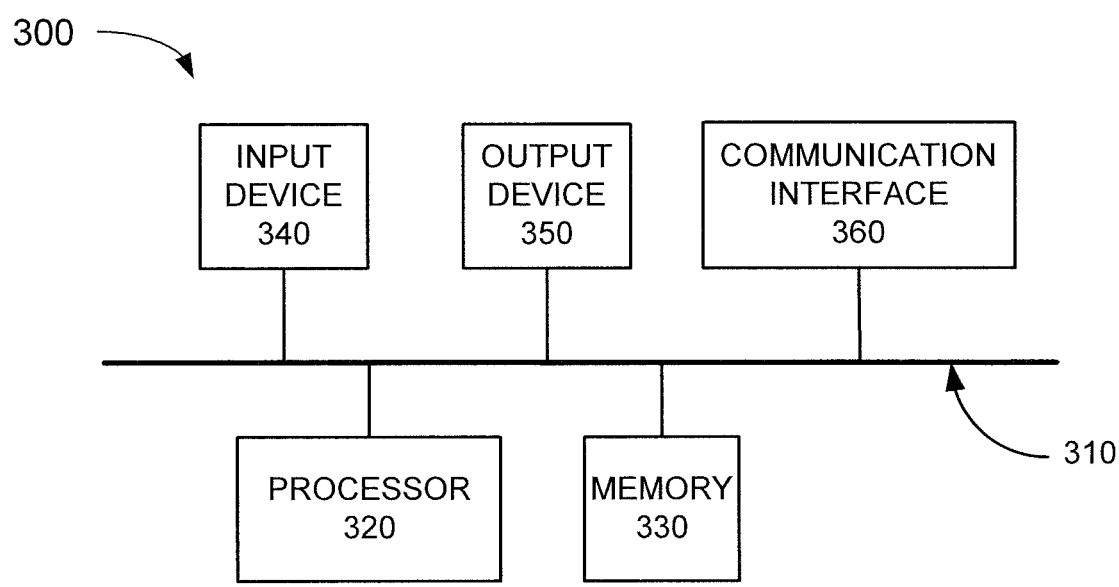
FIG. 3 is a diagram illustrating example components of a device, which may correspond to one of the components of the network device of FIG. 2 according to a first implementation described herein.

FIG. 3 is a diagram illustrating example components of a device 300 according to a first implementation described herein. Device 300 may correspond to one of the components of network element 110, such as input port 210, switching mechanism 220, output port 230, and/or control unit 240. Each of input port 210, switching mechanism 220, output port 230, and/or control unit 240 may include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include one or more processors, microprocessors, or processing logic (e.g., application specific integrated circuits (ASICs) or field programmable gate arrays (FPGAs)) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to device 300, such as a keypad, a button, a pen, a touch screen, voice recognition and/or biometric mechanisms, etc. Output device 350 may include a mechanism that outputs information to the operator, including one or more light indicators, a display, a speaker, etc.

Communication interface 360 may include any transceiver-like mechanism that enables device 300 to communicate with other devices and/or systems. For example, communication interface 360 may include a modem, a network interface card, and/or a wireless interface card.

As will be described in detail below, device 300 may perform certain operations. Device 300 may perform these operations in response to processor 320 executing software instructions contained in a computer-readable medium, such as memory 330. A computer-readable medium may be defined as one or more logical or physical memory devices. A logical memory device may include space within a single physical memory device or spread across multiple physical memory devices.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, additional components, or differently arranged components than depicted in FIG. 3. Additionally or alternatively, one or more components of device 300 may perform one or more tasks described as being performed by one or more other components of device 300.

Figure 4:
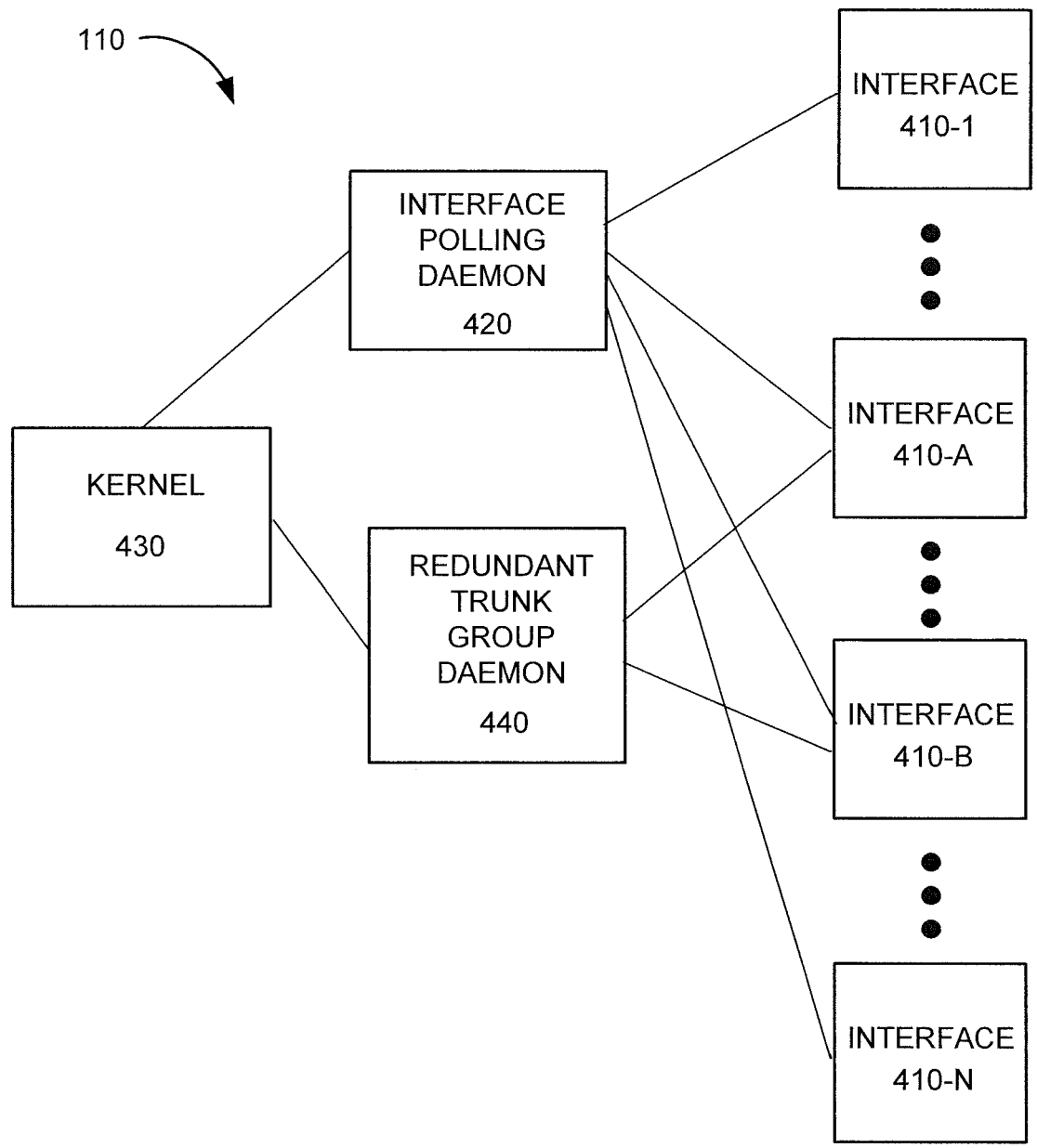
FIG. 4 is a first diagram illustrating example functional components of the network device of FIG. 2 according to the first implementation described herein.

FIG. 4 is a first diagram illustrating example components of network device 110 according to the first implementation described herein. FIG. 4 illustrates implementation of a redundant trunk group in network element 110. As shown in FIG. 4, network element 110 may include one or more interfaces 410-1 to 410-N (referred to herein individually as "interface 410" and collectively as "interfaces 410"), an interface polling daemon 420, a kernel 430, and one or more redundant trunk group (RTG) daemons 440 (referred to herein individually as "RTG daemon 440" and collectively as "RTG daemons 440").

Interface 410 may communicate with one or more remote interfaces located in one or more remote network devices 110. For example, interface 410 may send packets to a remote interface and/or receive packets from the remote interface. Interface 410 may be associated with one or more logical or physical ports (e.g., input ports 210 and/or output ports 230). A logical port may include functionality associated with a single physical port or may include functionality spread across multiple physical ports. Furthermore, a single physical port may be associated with multiple logical ports.

Interface 410 may perform datalink layer encapsulation and decapsulation; may look up a destination address of incoming traffic (e.g., any type or form of data, such as packet or non-packet data) in a forwarding table to determine its destination port (i.e., route lookup); may classify traffic into particular Quality of Service (QoS) classes; and/or may run datalink-level protocols and/or network-level protocols. Interface 410 may include a connectivity fault manager. A connectivity fault manager associated with interface 410 is described below with reference to FIG. 5.

Interface polling daemon 420 may include one or more background processes that poll interfaces 410-1 to 410-N for link loss events. A link loss event associated with a particular interface may corresponds to an error and/or malfunction at the physical layer (e.g., layer 1) of the particular interface. Thus, interface polling daemon 420 may detect error states associated with the physical layer. When interface polling daemon 420 detects an error state associated with a particular interface, interface polling daemon 420 may send a notification regarding the detected error state for the particular interface to kernel 430.

Kernel 430 may provide a bridge between processes running on network 110. For example, kernel 430 may provide a bridge between interfaces 410, between interface 410 and a daemon running on network element 110 (e.g., interface polling daemon 420 or RTG daemon 440), and/or between daemons running on network element 110. As another example, kernel 430 may provide a link between a process managing a routing table and a process managing a forwarding table. Kernel 430 may receive a notification from interface polling daemon 420 regarding a detected error state associated with a particular interface, may identify a particular RTG daemon 440 associated with the particular interface, and may send a notification to the particular RTG daemon 440 associated with the particular interface.

RTG daemon 440 may include one or more background processes that perform redundant trunk management for one or more particular interfaces 410, such as interface 410-A, which is associated with a trunk. A trunk may refer to a path or link designed to handle a large amount of traffic. Therefore, it may be particularly important to have redundant trunks in place. RTG daemon 440 may deactivate a particular interface associated with a trunk, if link loss is detected at the particular interface, and may activate a backup interface, associated with the trunk. For example, RTG daemon 440 may receive notification from kernel 430 that an error was detected for active interface 410-A, may deactivate active interface 410-A, may identify backup interface 410-B associated with interface 410-A, and may activate backup interface 410-B. Additionally or alternatively to receiving a notification from kernel 430, RTG daemon 440 may be activated by a connectivity fault manager associated with a particular interface. For example, the connectivity fault manager associated with a particular interface may detect a failure, error, and/or defect associated with interface 410-A, or associated with a link between interface 410-A and a remote interface, and may activate RTG daemon 440 in response to the detected failure, error, and/or defect. In response to being activated by the connectivity fault manager, RTG daemon 440 may deactivate interface 410-A, may identify backup interface 410-B associated with interface 410-A, and may activate backup interface 410-B.

Although FIG. 4 shows example functional components of network element 110, in other implementations, network element 110 may include fewer functional components, different functional components, differently arranged functional components, and/or additional functional components than depicted in FIG. 4. Additionally or alternatively, one or more functional components of network element 110 may perform one or more tasks described as being performed by one or more other functional components of network element 110.

FIG. 5 is a diagram illustrating example functional components of interface 410 and a relationship of interface 410 to a remote interface. The functional components shown in FIG. 5 may particularly relate to connectivity fault management in network element 110. As shown in FIG. 5, interface 410-X of network element 110-X may include connectivity fault manager 510-X and remote interface 410-Y of network element 110-Y may include connectivity fault manager 510-Y.

Connectivity fault manager 510-X may monitor the health of interface 410-X, may monitor a link between interface 410-X and remote interface 41-Y, may monitor the health of remote interface 410-Y, and/or may detect, identify, and/or isolate faults associated with interface 410-X, remote interface 410-Y, and/or a link between interface 410-X and remote interface 410-Y. For example, connectivity fault manager 510-X may detect layer 2 errors associated with interface 410-X, detect layer 2 errors associated with a link between interface 410-X and remote interface 410-Y, and/or receive notifications regarding layer 2 errors associated with remote interface 410-Y.

Similarly, connectivity fault manager 510-Y may monitor the health of remote interface 410-Y, may monitor a link between remote interface 410-Y and interface 41-X, may monitor the health of interface 410-X, and/or may detect, identify, and/or isolate faults associated with remote interface 410-Y, interface 410-X, and/or a link between interface 410-Y and interface 410-X. For example, connectivity fault manager 510-Y may detect layer 2 errors associated with remote interface 410-Y, detect layer 2 errors associated with a link between remote interface 410-Y and interface 410-X, and/or receive notifications regarding layer 2 errors associated with interface 410-X.

Connectivity fault manager 510-X may detect an error associated with interface 410 or an error associated with a remote interface. For example, connectivity fault manager 510 may detect a media access control (MAC) status failure at the physical layer (e.g., layer 1), or at the link layer (e.g., layer 2) of interface 410-X or a MAC status failure at the physical layer of remote interface 410-Y. Connectivity fault manager 510-X may detect a connectivity fault based on the detected MAC status failure, or based on an error rate associated with MAC status messages being greater than a loss threshold.

Connectivity fault manager 510-X may detect an error associated with a link between interface 410-X and remote interface 410-Y. For example, interface 410-X and remote interface 410-Y may exchange Congestion Control Messages (CCMs) at particular intervals. A CCM received from remote interface 410-Y by interface 410-X may indicate that a link between interface 410-X and remote interface 410-Y is functioning correctly. If a CCM is not received from remote interface 410-Y by interface 410-X within a particular time period (e.g., based on a timeout setting), interface 410-X may identify a CCM defect associated with the link between interface 410-X and remote interface 410-Y and may detect a connectivity fault based on the identified CCM defect or based on an error rate associated with received CCM messages being greater than a loss threshold.

Connectivity fault manager 510-X may receive indications of an aggregate health associated with remote interface 410-Y. For example, connectivity fault manager 510-X may receive a remote defect indicator (RDI) message from remote interface 410-Y. The RDI message may include information about the aggregate health of remote interface 410-Y. For example, an RDI message may be received periodically from remote interface 410-Y with information indicating that remote interface 410-Y is functioning properly. As another example, a particular RDI message may be received from remote interface 410-Y, indicating that remote interface 410-Y is in a particular error state. Connectivity fault manager 510-X may detect a connectivity fault based on the received RDI message that includes the indication that remote interface 410-Y is in a particular error state or based on an RDI message including information that an error rate associated with MAC status messages associated with remote interface 410-Y is greater than a loss threshold.

Although FIG. 5 shows example functional components of interface 410, in other implementations, interface 410 may include fewer functional components, different functional components, differently arranged functional components, and/or additional functional components than depicted in FIG. 5. Additionally or alternatively, one or more functional components of interface 410 may perform one or more tasks described as being performed by one or more other functional components of interface 410. Furthermore, while connectivity fault manager 510 has been described as being implemented in interface 410, in another implementation, connectivity fault manager 510 may be implemented in another functional component of network element 110. Moreover, while a single remote interface 410-Y has been illustrated in FIG. 5 for simplicity, interface 410-X may be associated with multiple remote interfaces and connectivity fault manager 510-X may communicate with each, or some, of the multiple remote interfaces associated with interface 410-X.

FIG. 6A is a diagram illustrating example functional components of connectivity fault manager 510 (e.g., connectivity fault manager 510-X or connectivity fault manager 510-Y) according to an implementation described herein. As shown in FIG. 6A, connectivity fault manager 510 may include redundant trunk group (RTG) activator 610, and a settings database (DB) 620.

RTG activator 610 may activate a particular RTG daemon 440 associated with interface 410 in response to detecting a connectivity fault associated with interface 410. RTG activator 610 may activate the particular RTG daemon 440 without notifying kernel 430, resulting in a faster activation of the particular RTG daemon 440 than if kernel 430 was notified. RTG activator 610 may identify the particular RTG daemon 440 by accessing settings database 620.

Settings database 620 may store information about particular settings associated with connectivity fault manager 510. Example fields that may be stored in settings database 620 are described below with reference to FIG. 6B.

Although FIG. 6A shows example functional components of connectivity fault manager 510, in other implementations, connectivity fault manager 510 may include fewer functional components, different functional components, differently arranged functional components, and/or additional functional components than depicted in FIG. 6A. Additionally or alternatively, one or more functional components of connectivity fault manager 510 may perform one or more tasks described as being performed by one or more other functional components of connectivity fault manager 510.

FIG. 6B is a diagram illustrating example fields of settings database 620 according to an implementation described herein. As shown in FIG. 6B, settings database 620 may include a loss threshold field 630, a timeout setting field 640, and an RTG daemon field 650.

Loss threshold field 630 may store information identifying one or more loss thresholds for identifying a connectivity fault. For example, a loss threshold may indicate a particular rate of information loss, or a particular error rate, associated with interface 410-X, associated with a link between interface 410-X and remote interface 410-Y, or associated with remote interface 410-Y. For example, the rate of information loss or error rate may correspond to a portion of messages that are not received by interface 410-X from interface 410-Y or to a portion of bits that are not received correctly in a particular message or group of messages received by interface 410-X from interface 410-Y during a particular period of time, based on an error checking process performed on the receive message or group of messages. As another example, the rate of information loss or error rate may correspond to an error rate associated with MAC status messages, associated with interface 410-X or associated with remote interface 410-Y.

Timeout setting field 640 may store information identifying one or more timeout settings for detecting that a particular message has not been received by interface 410-X. For example, a timeout setting may include a first period of time that needs to elapse without receiving a CCM message from remote interface 410-Y and/or a second period of time that needs to elapse without receiving an RDI message from remote interface 410-Y in order for connectivity fault manager 510 to detect a connectivity fault. In one implementation, a timeout setting may be set to 30 ms. In another implementation, the timeout setting may be set to a different value.

RTG daemon field 650 may identify a particular RTG daemon 440 associated with interface 410-X. RTG activator 610 may identify the particular RTG daemon 440 by accessing RTG daemon field 650.

Although FIG. 6B shows example fields of settings database 620, in other implementations, settings database 620 may contain fewer fields, different fields, additional fields, or differently arranged fields than depicted in FIG. 6B. Additionally or alternatively, one or more fields of settings database 620 may include information described as being included in one or more other fields of settings database 620.

Figure 7:
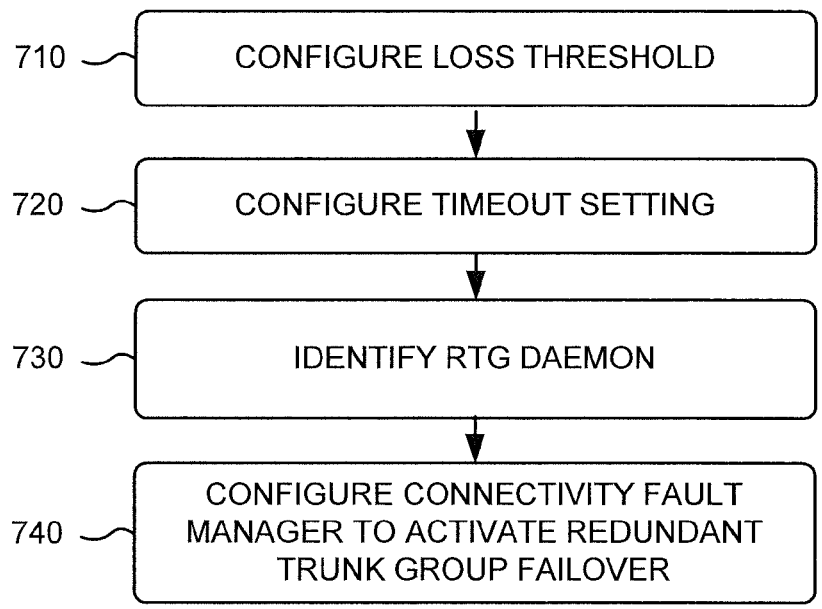
FIG. 7 is a diagram of a flow chart illustrating an example process for configuring a connectivity fault manager according to an implementation described herein.

FIG. 7 is a diagram of a flow chart illustrating an example process for configuring a connectivity fault manager according to an implementation described herein. In one implementation, the process of FIG. 7 may be performed by network device 110. In other implementations, some or all of the process of FIG. 7 may be performed by another device or a group of devices separate and/or possibly remote from or including network device 110.

The process of FIG. 7 may include configuring a loss threshold (block 710). For example, control unit 240 may configure a particular loss threshold for a particular interface and store the particular loss threshold in loss threshold field 630 of settings database 620 associated with the particular interface. In one implementation, control unit 240 may configure one or more loss thresholds based on a type of interface associated with the particular interface (e.g., whether the particular interface is associated with a physical or a logical port, whether the particular interface is associated with a virtual local area network (VLAN) and/or a type of VLAN associated with the particular interface, a type of physical port associated with the particular interface (e.g., Ethernet, optical, wireless, etc.), etc.) In another implementation, control unit 240 may configure the one or more loss thresholds based on other criteria, such as, for example, performance requirements associated with network element 110 or associated with the particular interface, or based on manual input of the one or more loss thresholds from an operator.

A timeout setting may be configured (block 720). For example, control unit 240 may configure a particular timeout setting for a particular interface and store the particular timeout setting in timeout setting field 640 of settings database 620 associated with the particular interface. In one implementation, control unit 240 may configure one or more loss timeout settings based on a type of interface associated with the particular interface (e.g., whether the particular interface is associated with a physical or a logical port, whether the particular interface is associated with a virtual local area network (VLAN) and/or a type of VLAN associated with the particular interface, a type of physical port associated with the particular interface (e.g., Ethernet, optical, wireless, etc.), etc.) In another implementation, control unit 240 may configure the one or more timeout settings based on other criteria, such as, for example, performance requirements associated with network element 110 or associated with the particular interface, or based on manual input of the one or more loss thresholds from an operator.

In one implementation, a timeout setting may be set to 30 ms. Thus, a connectivity fault may be detected within 30 ms. In another implementation, the timeout setting may be set to a different value.

An RTG daemon may be identified (block 730). For example, network element 110 may include multiple RTG daemons running and control unit 240 may identify a particular RTG daemon 440 associated with the particular interface and store information identifying the particular RTG daemon 440 in RTG daemon field 650 of settings database 620 associated with the particular interface.

A connectivity fault manager may be configured to activate a redundant trunk group failover (block 740). For example, control unit 240 may configure connectivity fault manager 510 to activate the particular RTG daemon if connectivity fault manager 510 detects a connectivity fault associated with the particular interface, a connectivity fault associated with a link between the particular interface and a remote interface, or a connectivity fault associated with the remote interface.

Figure 8:
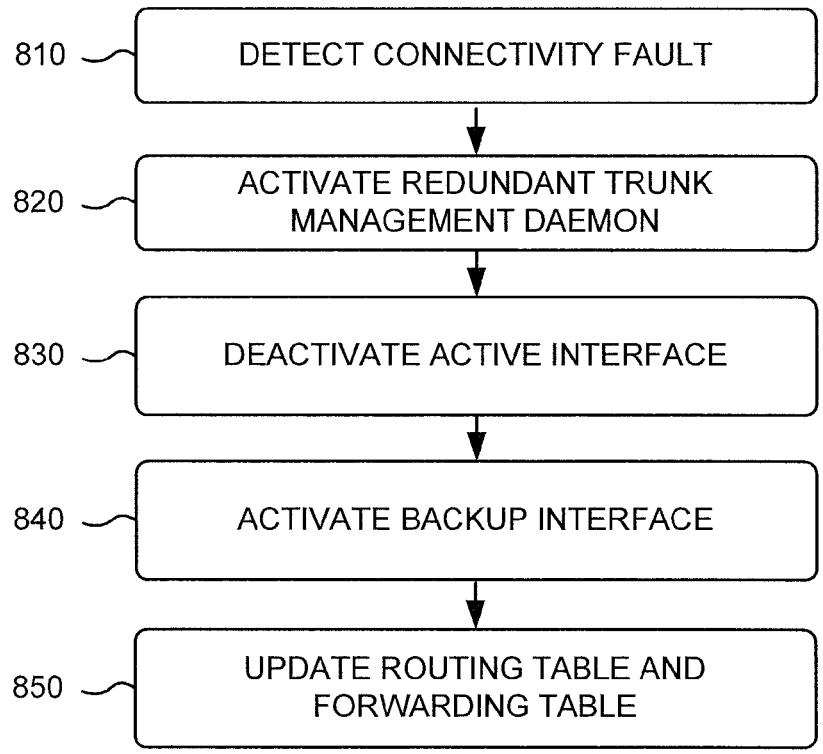
FIG. 8 is a diagram of a flow chart illustrating an example process of triggering a redundant trunk group failover using a connectivity fault manager according to an implementation described herein.

FIG. 8 is a diagram of a flow chart illustrating an example process of triggering a redundant trunk group failover using a connectivity fault manager according to an implementation described herein. In one implementation, the process of FIG. 8 may be performed by network device 110. In other implementations, some or all of the process of FIG. 8 may be performed by another device or a group of devices separate and/or possibly remote from or including network device 110.

The process of FIG. 8 may include detecting a connectivity fault (block 810). For example, connectivity fault manager 510 may detect a connectivity fault associated with a particular interface, a connectivity fault associated with a link between the particular interface and a remote interface, or a connectivity fault associated with the remote interface. In one implementation, connectivity fault manager 510 may detect layer 2 errors (e.g., link layer errors and/or errors associated with Ethernet frames) associated with a particular interface, associated with a link between the particular interface and a remote interface, or associated with the remote interface. In another implementation, connectivity fault manager 510 may detect errors associated with a different network layer, or an additional network layer, associated with a particular interface, associated with a link between the particular interface and a remote interface, or associated with the remote interface.

Connectivity fault manager 510 may detect a connectivity fault based on a detected MAC status failure associated with the particular interface, or based on an error rate associated with MAC status messages, associated with the particular interface, being greater than a loss threshold; may detect a connectivity fault based on a CCM defect associated with the link between the particular interface and a remote interface or based on an error rate associated with received CCM messages, received from the remote interface, being greater than a loss threshold; and/or may detect a connectivity fault based on an RDI message, received from the remote interface, that includes the indication that remote interface is in a particular error state or based on an RDI message including information that an error rate associated with MAC status messages associated with remote interface is greater than a loss threshold.

An RTG daemon may be activated (block 820). For example, RTG activator 610 of connectivity fault manager 510 may identify a particular RTG daemon 440 associated with the particular interface by accessing RTG daemon field 650 of settings database 620, and may activate the identified RTG daemon 440. RTG activator 610 may activate the identified RTG daemon 440 without notifying kernel 430.

An active interface may be deactivated (block 830). For example, the activated RTG daemon 440 may deactivate the particular interface for which the connectivity fault was detected. A backup interface may be activated (block 840). For example, the activated RTG daemon 440 may identify a backup interface associated with the deactivated interface and may activate the backup interface.

A routing table and a forwarding table may be updated (block 850). For example, control unit 240 may adjust a routing table to reflect new routing paths that use the newly activated back up interface instead of the deactivated interface. After adjusting the routing table, control unit 240 may recalculate a forwarding table based on the adjusted routing table. For example, control unit 240 may recalculate a spanning tree protocol by including the newly activated backup interface in the spanning tree protocol.

CONCLUSION

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with respect to FIGS. 7 and 8, the order of the blocks may be modified in other implementations. Further, non-dependent blocks may be performed in parallel.

Also, certain portions of the implementations may have been described as a "component," "daemon," "kernel," "manager," or "activator" that performs one or more functions. The terms "component," "daemon," "kernel," "manager," and "activator" may include hardware, such as a processor, an ASIC, or a FPGA, or a combination of hardware and software (e.g., software running on a processor).

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed:

1. A network element comprising:
    a memory; and
    one or more processors to:
        detect a connectivity fault associated with a particular interface, a link between the particular interface and a remote interface, or the remote interface,
        identify a redundant trunk group daemon, of a plurality of redundant trunk group daemons, that is associated with the particular interface;
        activate the redundant trunk group daemon based on detecting the connectivity fault and without notifying a kernel,
            the kernel being a bridge between processes running on a network associated with the redundant trunk group daemon, and
            the kernel being communicatively coupled to the redundant trunk group daemon,
        deactivate the particular interface based on activating the redundant trunk group daemon, and
        activate a backup interface based on deactivating the particular interface.

2. The network element of claim 1,
    where the connectivity fault is a layer 2 connectivity fault, and
    where the redundant trunk group daemon receives a notification of a layer 1 link down event before the backup interface is activated.

3. The network element of claim 1, where the redundant trunk group daemon receives a notification of a link down event from an interface polling daemon via the kernel.

4. The network element of claim 1, where, when detecting the connectivity fault, the one or more processors are to:
    detect the connectivity fault based on a media access control status failure associated with the particular interface.

5. The network element of claim 1, where, when detecting the connectivity fault, the one or more processors are to:
    detect the connectivity fault based on failing to receive a particular message from the remote interface within a particular period of time.

6. The network element of claim 5,
    where the particular message includes a congestion control message, and
    where the particular period of time corresponds to 30 ms.

7. The network element of claim 1, where, when detecting the connectivity fault, the one or more processors are to:
    detect the connectivity fault based on receiving a remote defect indicator message from the remote interface,
        the remote defect indicator message including information about health of the remote interface.

8. A method comprising:
- detecting, by an interface of a network device, a connectivity fault associated with the interface, a link between the interface and a remote interface, or the remote interface;
- identifying, by the interface and based on detecting the connectivity fault, a redundant trunk daemon, of a plurality of redundant group daemons, that is associated with the interface;
- activating, by the interface and without notifying a kernel, the redundant trunk daemon,
  - the kernel being a bridge between processes running on a network associated with the redundant trunk daemon, and
  - the kernel being connected to the redundant trunk daemon;
- deactivating, by a processor of the network device, the interface based on activating the redundant trunk daemon; and
- activating, by the processor and using the redundant trunk daemon, a backup interface associated with the interface based on deactivating the interface.

9. The method of claim 8,
- where the connectivity fault comprises a layer 2 connectivity fault, and
- where the redundant trunk daemon receives a notification of a layer 1 link down event before activating the backup interface.

10. The method of claim 8, where the connectivity fault comprises a media access control status failure associated with the interface.

11. The method of claim 8, where detecting the connectivity fault comprises:
- determining that a particular message is not received from the remote interface within a particular period of time, and
- detecting the connectivity fault based on determining that the particular message is not received within the particular period of time.

12. The method of claim 11,
- where the particular message includes a congestion control message, and
- where the particular period of time is 30 ms.

13. The method of claim 8, where detecting the connectivity fault comprises:
- receiving a remote defect indicator message from the remote interface,
  - the remote defect indicator message including information regarding health of the remote interface, and
  - detecting the connectivity fault based on the remote defect indicator message.

14. The method of claim 8, further comprising:
- configuring a loss threshold for the interface,
  - the loss threshold being associated with an error rate associated with messages received from the remote interface, and
  - detecting the connectivity fault comprising:
    - detecting that the error rate is greater than the loss threshold, and
    - detecting the connectivity fault based on the error rate being greater than the loss threshold.

15. The method of claim 8, further comprising:
- configuring a timeout setting for the interface,
  - the timeout setting being associated with a particular period of time, and
  - detecting the connectivity fault comprising:
    - detecting that a particular message has not been received from the remote interface within the particular period of time, and
    - detecting the connectivity fault based on detecting that the particular message has not been received within the particular period of time.

16. The method of claim 8, further comprising:
- adjusting a routing table associated with the network device based on activating the backup interface.

17. A non-transitory computer-readable medium storing instructions, the instructions comprising:
- one or more instructions that, when executed by at least one processor, cause the at least one processor to:
  - detect a connectivity fault associated with an interface of a network element,
  - identify a redundant trunk group daemon, of a plurality of redundant trunk group daemons, that is associated with the interface;
  - activate the redundant trunk group daemon based on detecting the connectivity fault and without notifying a kernel,
    - the kernel being a bridge between processes running on a network associated with the redundant trunk group daemon, and
    - the kernel being communicatively coupled to the redundant trunk group daemon,
  - deactivate the interface based on activating the redundant trunk group daemon, and
  - activate a backup interface based on deactivating the interface.

18. The non-transitory computer-readable medium of claim 17, where the one or more instructions to detect the connectivity fault comprise:
- one or more instructions that, when executed by at least one processor, cause the at least one processor to:
  - configure a loss threshold for the interface,
    - the loss threshold being associated with an error rate associated with messages received from a remote interface,
  - detect that the error rate is greater than the loss threshold, and
  - detect the connectivity fault based on the error rate being greater than the loss threshold.

19. The non-transitory computer-readable medium of claim 17, where the one or more instructions to detect the connectivity fault comprise:
- one or more instructions that, when executed by at least one processor, cause the at least one processor to:
  - configure a timeout setting for the interface,
    - the timeout setting being associated with a particular period of time,
  - detect that a particular message has not been received from a remote interface within the particular period of time, and
  - detect the connectivity fault based on detecting that the particular has not been received within the particular period of time.

20. The non-transitory computer-readable medium of claim 17, where the connectivity fault is detected within 30 ms.

* * * * *